United States Patent [19]

Ohya et al.

[11] Patent Number: 4,945,231
[45] Date of Patent: Jul. 31, 1990

[54] COMPOUND ROTARY ENCODER FOR DETECTING THE ROTATION ANGLE AND THE NUMBER OF ROTATIONS OF A ROTOR SHAFT

[75] Inventors: Hideshi Ohya; Takao Miyatani, both of Toyota; Keiji Kawamura, Chiryu; Yasutomo Kawabata, Aichi, all of Japan

[73] Assignee: Toyota Jidosha Kabushiki Kaisha, Japan

[21] Appl. No.: 360,191

[22] Filed: Jun. 1, 1989

[30] Foreign Application Priority Data

Jun. 2, 1988 [JP] Japan .................................. 63-136092
Jun. 2, 1988 [JP] Japan .................................. 63-136094
Jun. 2, 1988 [JP] Japan .................................. 63-136093
Jun. 3, 1988 [JP] Japan .................................. 63-137890

[51] Int. Cl.$^5$ ............................................. G01D 5/34
[52] U.S. Cl. .......................... 250/231.14; 250/231.16; 250/231.17; 250/231.18; 250/237 G
[58] Field of Search .................. 250/231 SE, 237 G; 356/375; 33/707; 341/13

[56] References Cited

U.S. PATENT DOCUMENTS

| 4,358,753 | 11/1982 | Cascini | 341/2 |
| 4,633,224 | 12/1986 | Gipp et al. | 341/13 |
| 4,736,187 | 4/1988 | Kibrick et al. | 341/3 |

FOREIGN PATENT DOCUMENTS

| 60-100014 | 6/1985 | Japan . |
| 60-100015 | 6/1985 | Japan . |
| 63-108225 | 5/1988 | Japan . |
| 63-201522 | 8/1988 | Japan . |

Primary Examiner—David C. Nelms
Assistant Examiner—George C. Beck
Attorney, Agent, or Firm—Finnegan, Henderson, Farabow, Garrett & Dunner

[57] ABSTRACT

In the compound rotary encoder of this invention, an absolute signal representing the upper m bits of a rotation angle signal, and an icreametal signal used for detecting the lower bits of the rotation angle signal are detected to obtain more detailed rotation angle information. Moreover, the rotation angle obtained by counting the incremental signal closely matches that obtained from the absolute signal, assuring the detection of the rotation angle with high resolution and precision. Since a rotating disk has only m bits of absolute code pattern, the rotary encoder can be small. This permits the absolute code pattern to have greater diametrical width so that a large output of the absolute signal can be stably obtained. On the other hand, the number of rotations can be obtained by counting and compensating a standard position signals. Since the rotary disk has the patterns both for detecting the standard position signal and for detecting the rotation angle, this too allows the rotary encoder to be small.

5 Claims, 7 Drawing Sheets

COMPOUND ROTARY ENCODER FOR DETECTING THE ROTATION ANGLE AND THE NUMBER OF ROTATIONS OF A ROTOR SHAFT

BACKGROUND OF THE INVENTION

The present invention relates to a compound rotary encoder for detecting the rotation angle and the number of rotations of a rotating disk connected to a rotor shaft.

Prior-art rotary encoders for detecting the rotation angle of the rotor shaft include both incremental and absolute rotary encoders. An incremental rotary encoder has evenly spaced binary-code patterns on the rotating disk connected to the rotor shaft. While the rotating disk rotates, the binary code patterns are detected as pulse signals, the pulse signals are counted, and thus the rotation angle of the rotor shaft is detected.

The patterns can be easily formed on the rotating disk of the incremental rotary encoder. The resolution of the pulse signals can be enhanced by increasing the number of binary-code patterns However, when the rotor shaft rotates slowly, the interval of pulsation lengthens, and the precision of control is impaired. Moreover, detected values often deviate from correct values due to electrical noise. On the other hand, the absolute encoder can instantly detect the absolute position corresponding to the rotation angle from its sensor without using a counter.

A representative detecting board for the absolute encoder is a rotating disk. On the face of the rotating disk, concentric circular patterns are formed whose number corresponds to the number of signal bits. Binary patterns are detected from these circular patterns In the absolute encoder, when n denotes the number of signal bits, the resolution is $2^n$. For example, when ten sensors are used, the rotary encoder has a resolution of $2^{10} = 1024$. However, to enhance the resolution, more sensors and finer circular patterns are required, thus increasing the cost of the encoder. Moreover, when the rotating disk is reduced in size, the circular patterns decrease in diametrical width, and the information in the circular patterns becomes harder to detect.

A compound prior-art rotary encoder is disclosed in the Japan Published Unexamined Patent Application No. S60-100015. The rotary encoder has both incremental code patterns and circular absolute code patterns on its rotating disk. The rotary encoder detects the rotation speed of the rotor shaft using the incremental code patterns and detects the rotation angle of the rotor shaft using the absolute code patterns. The signals detected from the incremental code patterns are processed independently of the signals detected from the absolute code patterns. Consequently, the number of absolute code patterns must be increased to detect the rotation angle of the rotor shaft with higher resolution. The accuracy of the rotation angle detected from signals may vary due to errors in the detection of signals or due to the missing of pulses.

This prior-art rotary encoder detects the rotation angle of the rotor shaft as the number of rotations by decelerating the rotor shaft with gears and other mechanism.

Since the encoder has the system for decelerating the rotor shaft for the detection of the number of rotations, it cannot be reduced in size, and many components are required.

In this way, the prior-art rotary encoder detects the number of rotations of the rotor shaft independent of the rotation angle. The detected rotation angle does not coincide with the detected number of rotations.

For example, although the detected rotation angle is only 359 degrees, the rotation count might increase. Moreover, although an additional rotation angle of one degree is detected, the number of rotation might not increase. This problem increases in severity, when the resolution of the rotary encoder increases.

The prior-art rotary encoder converts the number of rotations as well as the rotation angle from parallel signals into serial signals, and transmits the signals to a motor controller, where the serial signals are converted back into parallel signals. Parallel signals are used for control. By using serial signals to transmit, the number of transmission wires can be reduced.

However, when the resolution of the rotation angle signals increases, the time for detecting a least significant bit of the rotation angle signals shortens due to the time required for transmitting and converting serial signals. The transmission and conversion of signals delay the detection of the rotation angle signals. Since signals must be transmitted rapidly, some bits are lost during the transmission of signals. The reliability in the transmission is thus impaired. On the other hand, when parallel signals are transmitted to the motor controller without being converted to serial signals, the number of transmission wires would increase.

SUMMARY OF THE INVENTION

One object of the present invention is to provide a small rotary encoder that detects the rotation angle and the number of rotations of a rotor shaft with high resolution and precision. Another object of the present invention is to provide a rotary encoder with the fewest transmission wires possible, where delay in the detection of signals due to the conversion and transmission of signals is minimized.

These objects are realized in a compound rotary encoder comprising a timing-signal detecting means, an absolute-signal detecting means, an incremental-signal detecting means, and a timing control means. The timing-signal detecting means includes a timing code pattern on a rotating disk, and a timing-signal determining portion for reading the timing code pattern and detecting a timing signal. The absolute-signal detecting means includes an absolute code pattern on the rotating disk, an absolute-signal detecting portion on a fixed board for reading the absolute code pattern and detecting an absolute signal, and an absolute-signal determining portion for detecting upper m bits of n-bit rotation-angle signal of a rotor shaft from the absolute signal, in which m is larger than one and less than n, and m and n are integers. The incremental-signal detecting means includes an incremental code pattern on the rotating disk, an incremental-signal detecting portion on the fixed board for reading the incremental code pattern and for detecting an incremental signal, and an incremental-signal determining portion for counting the incremental signal from the incremental-signal detecting portion, detecting a counted value of the incremental signal and for delivering the lower l bits of the n-bit rotation-angle signal, in which l is n minus m. The timing control means for delivering the upper m bits of the rotation-angle signal and simultaneously initializing the counted value of the incremental-signal determining portion in synchrony with the timing signal.

BRIEF DESCRIPTION OF THE DRAWINGS

By way of example and to make the description clearer, reference is made to accompanying drawings in which.

DETAILED DESCRIPTION OF PREFERRED EMBODIMENTS

In the present invention, a rotary encoder optically detects the rotation angle and magnetically detects the number of rotations. The rotation angle is detected as a 15-bit digital signal ($2^{15} = 32768$ divisions). The upper eight bits are detected using an absolute code pattern and the lower seven bits are detected using an incremental code pattern. The number of rotations is detected as an 8-bit digital signal ($2^8 = 256$, 0-255 rotations).

Figure 1:
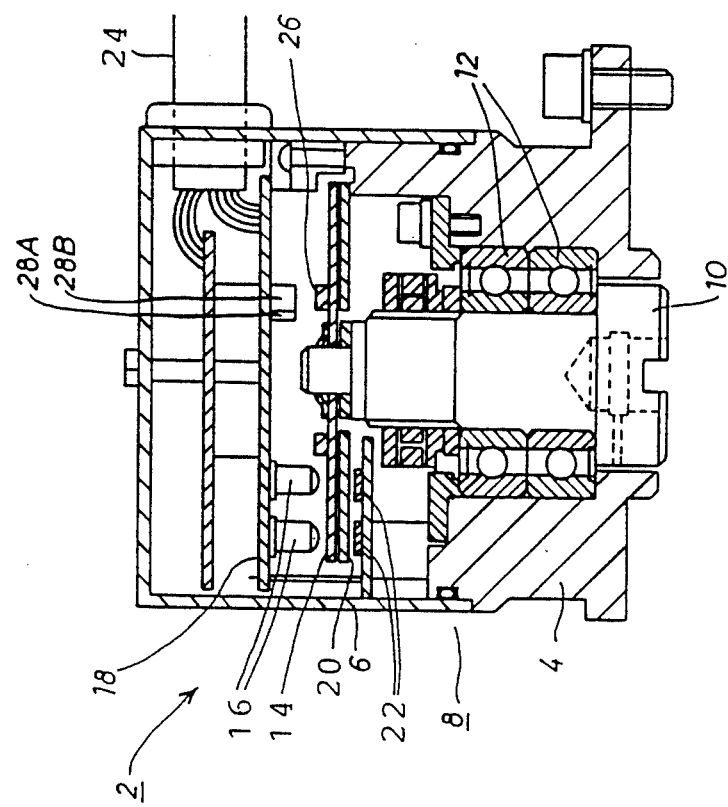
FIG. 1 is a sectional view of a compound rotary encoder for the embodiments.

As shown in FIG. 1, an encoder 2 has a housing 8. The housing 8 includes a substrate 4 and a cover 6. A rotor shaft 10 projects from the substrate 4, and is supported by bearings 12 mounted on the substrate 4. A rotating disk 14, mounted on the rotor shaft 10, rotates with the rotor shaft 10. As described later, an absolute code pattern, an incremental code pattern, and a standard position pattern are located on the rotating disk 14.

Emission elements 16 are located behind the rotating disk 14, and are mounted on a waveform-shaping circuit substrate 18. The waveform-shaping circuit substrate 18 is fixed in the housing 8, and extends toward one face of the rotating disk 14.

A fixed slit board 20 faces the other face of the rotating disc 14, and has multiple slits in its face as described later.

Light-receiving elements 22 are disposed opposite the rotating disc 14, which faces the back of the fixed slit board 20. Absolute signals and incremental signals are detected at a detection portion where the slits in the fixed slit board 20 are combined with the corresponding light-receiving elements 22. The light-receiving elements 22 transmit information to the waveform-shaping circuit substrate 18. The waveform-shaping circuit substrate 18 transmits information through a lead wire 24 to outside the housing 8.

A circular magnetic strip 26, on which a standard position pattern is recorded, is mounted on the back of the rotating disk 14. Two magnetic detection elements 28A and 28B are mounted on the waveform-shaping circuit substrate 18 and opposite the magnetic strip 26. The magnetic detection elements 28A and 28B transmit information to the waveform-shaping circuit substrate 18. The information then is transmitted through the lead wire 24 outside the housing 8 together with the rotation angle signal.

Figure 2:
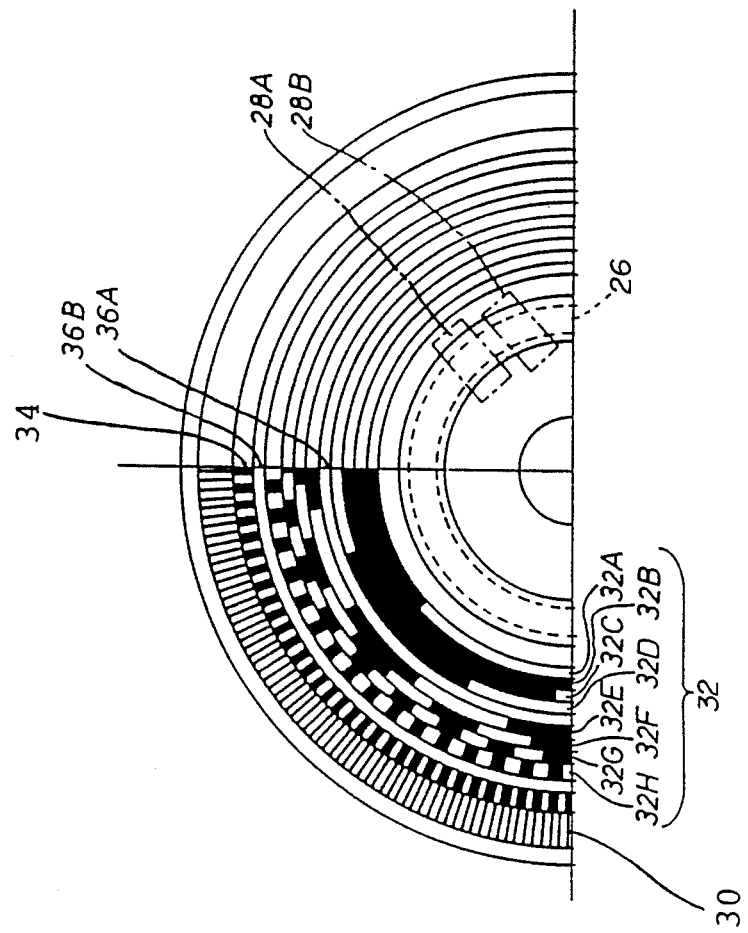
FIG. 2 is a partial plan view of a rotating disk showing all of the code patterns for the embodiments.

As shown in FIG. 2, an incremental code pattern 30 consists of evenly spaced slits in the outer periphery of the rotating disk 14. An absolute code pattern 32 consists of eight concentric circular patterns 32A-32H on the inner periphery of the rotating disk 14. A timing code pattern 34 is located between the incremental code pattern 30 and the absolute code pattern 32. The magnetic strip 26 is also mounted on the rotating disk 14, and bears the standard position pattern.

These patterns 30, 32 and 34, excluding the standard position pattern, are rows of slits formed according to a predetermined rule. These rows of slits are formed by coating the transparent rotating disk 14 with a shielding evaporation membrane, and then etching slits in the membrane.

For the standard position pattern, north and south magnetic poles N and S are recorded on the magnetic strip 26 mounted on the back of the rotating disk 14. The magnetic detection elements 28A and 28B detect two standard position signals: one where the north magnetic pole N switches to the south magnetic pole S and the other where the south magnetic pole S switches back to the north magnetic pole N during one rotation of the rotating disk 14. In FIG. 2, the magnetic detection elements 28A and 28B shown by dashed-line rectangles are mounted on the waveform-shaping circuit substrate 18.

Luminous energy compensation tracks 36A and 36B are provided between the circular patterns 32D and 32E, and between the circular pattern 32H and the timing code pattern 34, respectively.

The absolute code pattern 32 consisting of eight concentric circular patterns 32A-32H extends peripherally from a predetermined standard diameter. This embodiment uses 4-bit Gray code (reflected binary code), which logically represents the absolute code pattern 32 as follows:

| DECIMAL CODE | GRAY CODE |
| --- | --- |
| 0 | 0000 |
| 1 | 0001 |
| 2 | 0011 |
| 3 | 0010 |
| 4 | 0110 |
| 5 | 0111 |
| 6 | 0101 |
| 7 | 0100 |
| 8 | 1100 |
| 9 | 1101 |

The logical value of the circular patterns 32A-32H is formed by a shading pattern in the rows of slits.

Figure 3:
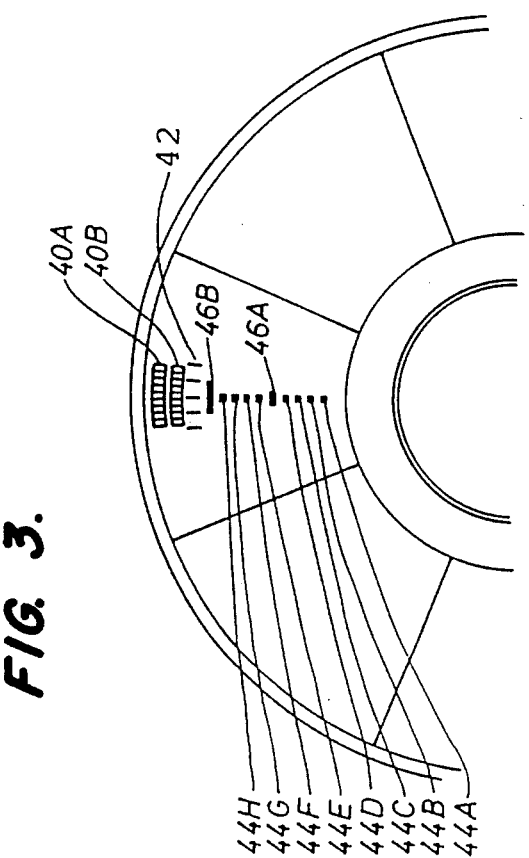
FIG. 3 is a partial plan view of a fixed slit board showing the arrangement of the slits.

On the other hand, as shown in FIG. 3, the fixed slit board 20 has incremental signal detection slits 40A and 40B, timing signal detection slits 42, absolute signal detection slits 44A-44H and luminous energy compensation slits 46A and 46B.

The incremental signal detection slits 40A and 40B generate A-phase and B-phase incremental signals in cooperation with the incremental code pattern 30 on the rotating disk 14. The output phase of the A-phase incremental signal deviates by ninety degrees from that of B-phase incremental signal.

The timing signal detection slits 42 generate the timing signal in cooperation with the timing code pattern 34 on the rotating disk 14. Since the timing signal should rapidly rise or fall, the slits 42 are very narrow, as narrow as 30 microns each. There are five slits 42 to secure more luminous energy.

On the other hand, the absolute signal detection slits 44A-44H generate absolute signals A-H in cooperation with the circular patterns 32A-32H on the rotating disk 14. Since the absolute signals A-H are issued using the timing pulses, the slits 44A-44H can be as wide as 240 microns and sufficient luminous energy can be secured. The timing signal changes at a half interval of the absolute signal H.

The rotating disk 14 and the fixed slit board 20 are fixed in the housing 8 so that one circular signal pattern corresponds to each slit and the magnetic strip 26 faces the magnetic detection elements 28A and 28B.

Figure 6:
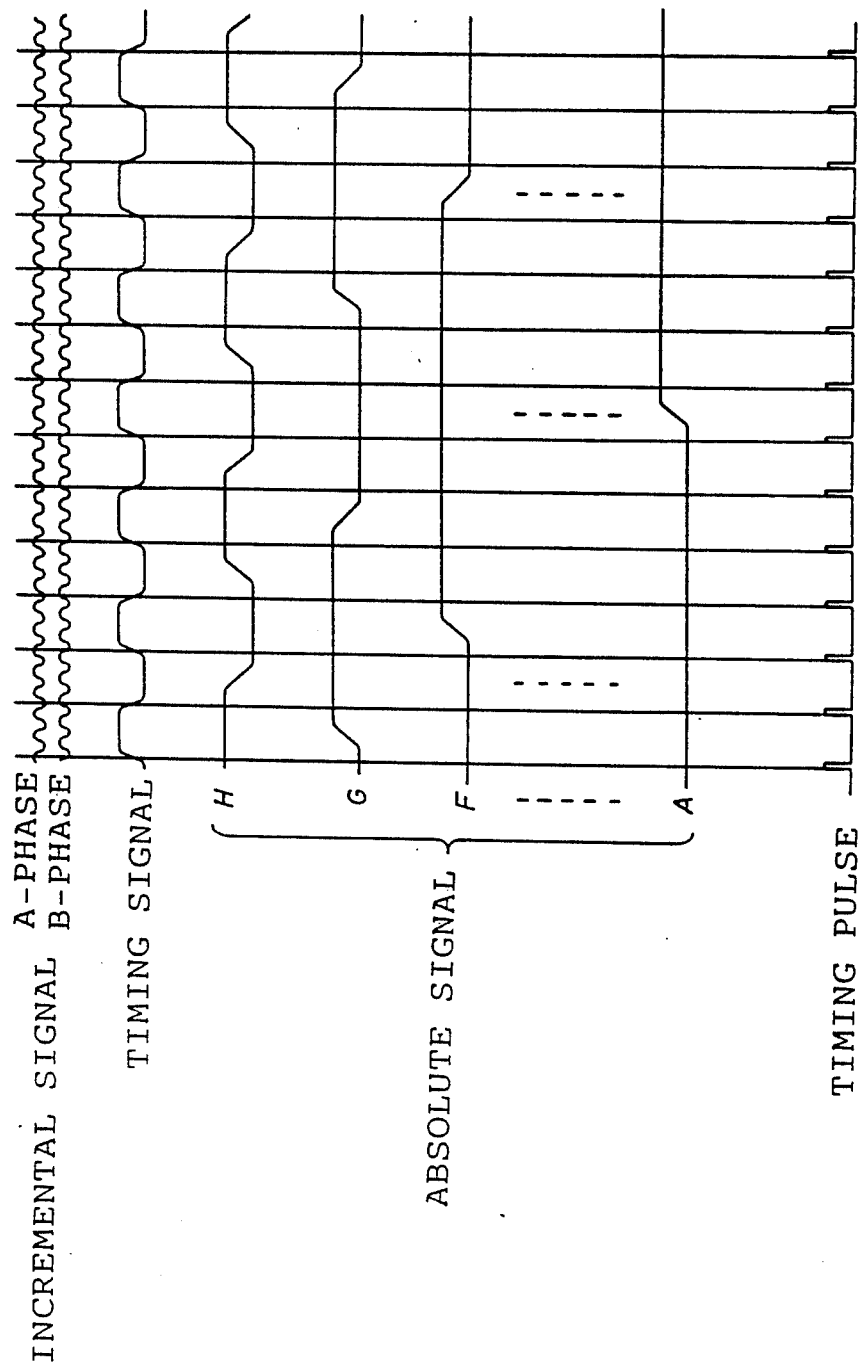
FIG. 6 is an illustration of output signals from the light receiving elements of the embodiments.

As shown in FIG. 6, the light-receiving elements 22 issue signals when the rotating disk 14 rotates. In the circuit shown in FIG. 4, these signals are turned into a 15-bit digital signal b1-b15 which represents the rotation angle.

First, the timing signal and the gate-delayed timing signal are transmitted to an exclusive-OR (EX-OR) 50 to obtain a timing pulse.

When the absolute signals A-H are fed into a D-flip-flop circuit 52 and the timing pulse is fed to a clock terminal CK in the flipflop circuit 52, the upper eight bits b8-b15 of the rotation angle signal are delivered from the flip-flop circuit 52.

The A-phase and B-phase incremental signals, which deviate ninety degrees from each other, are fed into an updown identification circuit 54. The circuit 54 determines whether the rotating disk 14 rotates forward or backward, and delivers an updown signal of zero when the disk 14 rotates forward and an updown signal of one when the disk 14 rotates backward.

The A-phase and B-phase incremental signals are also fed to a frequency multiplier circuit 56. The frequency multiplier circuit 56 delivers the pulse signal multiplied by four.

Subsequently, the updown signal is transmitted into the updown terminals D/U and preset terminals A1-A4 of two 4-bit updown counters 58 and 60. A clock pulse is fed to a clock terminal CK in the first updown counter 58. Each time one clock pulse is fed, each bit increases or decreases by one.

When the timing pulse is fed to the load terminals L of the updown counters 58 and 60, each bit is set to zero when the rotating disk 14 rotates forward, and each bit is set to one when the disk 14 reverses.

As a result, the lower seven bits b1-b7 of the rotation angle signal are delivered from output terminals B1-B4 of the first counter 58 and output terminals B1-B3 of the second counter 60. In this embodiment, output from the last output terminal B4 of the second counter 60 is not used. Thus, the 15-bit digital signal b1-b15 is derived by obtaining bits b8-b15 from the absolute signal and bits b1-b7 from the incremental signal in response to the timing pulse.

In this embodiment, when the timing pulse is generated, the absolute signal is received and the incremental signal is initialized. Consequently, the rotation angle can be detected with high resolution and precision using the incremental signal.

Figure 4:
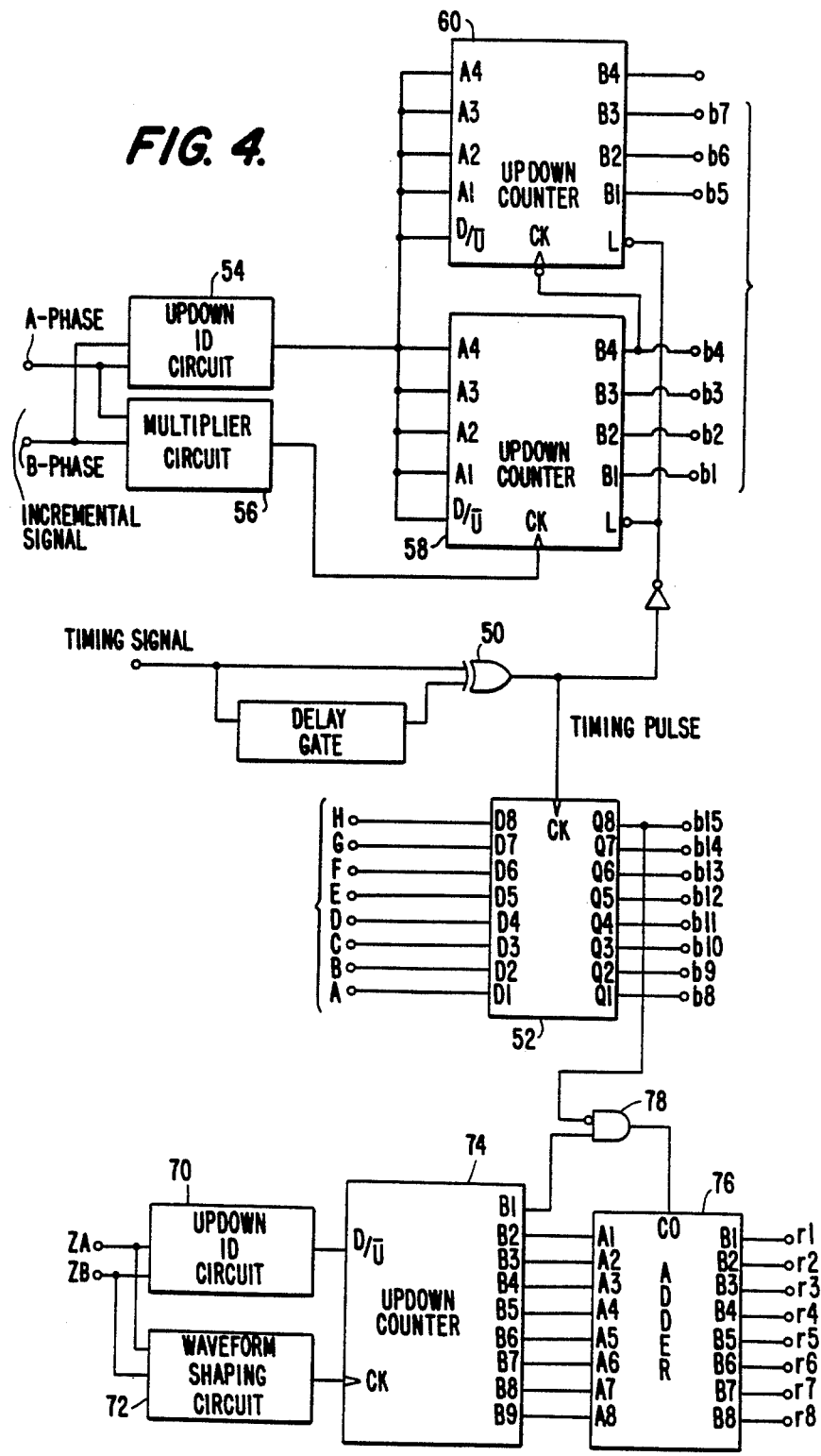
FIG. 4 is a block diagram of a waveform-shaping circuit for the first embodiment.

On the other hand, the number of rotations is detected by processing two standard position signals ZA and ZB, which are detected by the magnetic detection elements 28A and 28B in FIG. 1, in the circuit shown in FIG. 4.

Figure 7:
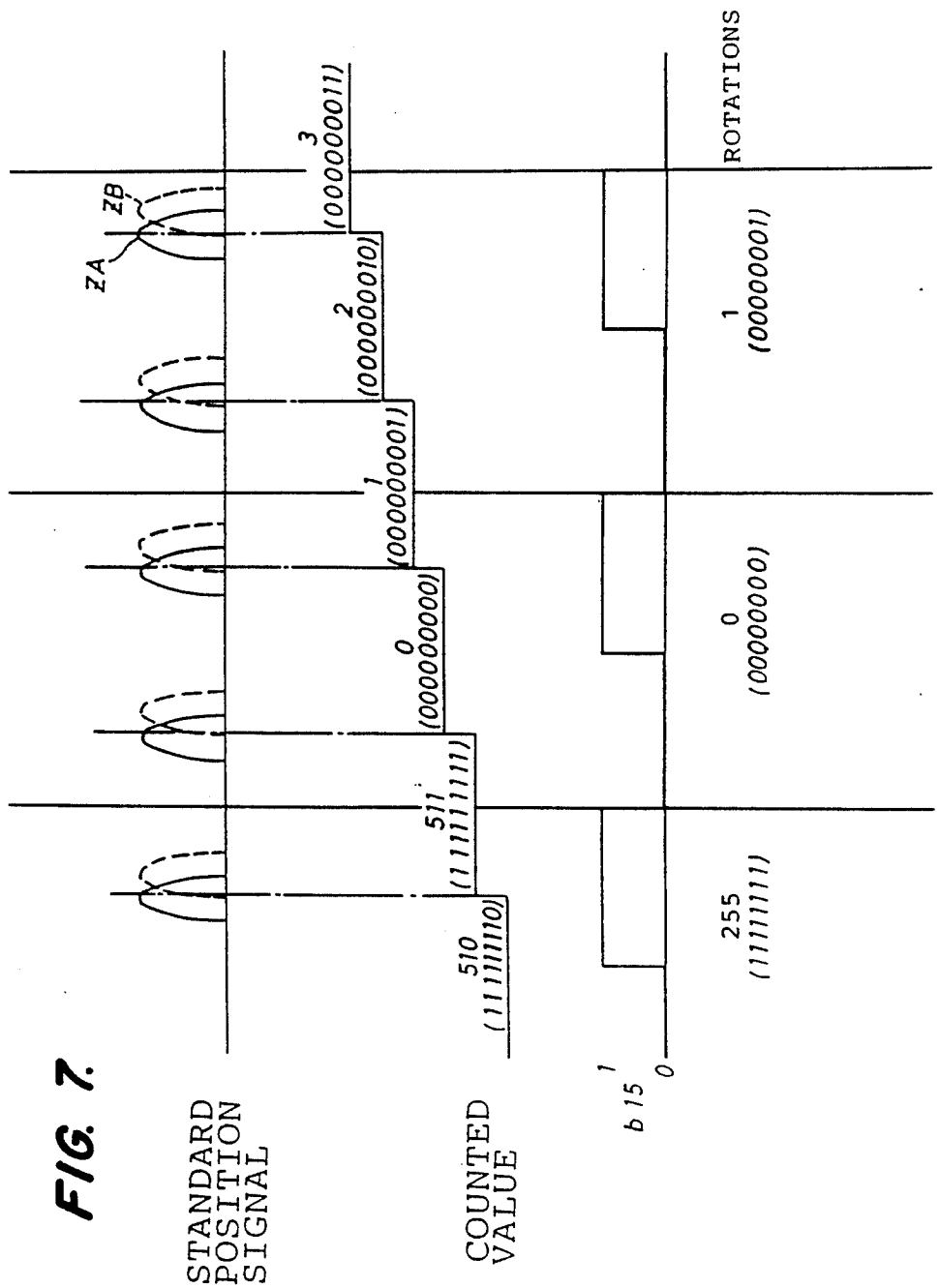
FIG. 7 is an illustration explaining the detection of the number of rotations of a rotor shaft for the embodiments.

As shown in FIG. 7, 9-bit digital signals are obtained by counting the number of pulses of the standard position signals ZA and ZB. Bit b15 is the most significant bit of the rotation angle signal. The number of rotations is detected as shown in FIG. 7.

The standard position signals ZA and ZB are detected by the magnetic detection elements 28A and 28B, and are fed into an updown identification circuit 70. The updown identification circuit 70 determines whether the rotating disk 14 is rotating forward or backward, and delivers an updown signal of zero when the rotating disk 14 rotates forward and an updown signal of one when the disk 14 rotates backward.

A pulse-waveform-shaping circuit 72 receives the standard position signals ZA and ZB and delivers a pulse signal. The updown signal is sent to the updown terminal D/$\overline{U}$ of a 9-bit updown counter 74. The pulse signal is sent to the clock terminal CK of the updown counter 74. Subsequently, the updown counter 74 delivers the upper eight bits of nine bits counted into an adder 76.

On the other hand, an AND gate 78 receives the least significant bit of the counted values, and the inverted signal of the most significant bit b15 of the rotation angle signal. The result from the AND gate 78 is sent to a terminal Co of the adder 76, where the result is added to the upper eight bits of the counted value to obtain an 8-bit rotation number r8-r1.

As shown in FIG. 7, when the most significant bit b15 of the rotation angle is one, the upper eight bits of the counted value represent the number of rotations. Also, when the most significant bit b15 of the rotation angle signal is zero and the least significant bit of the counted value is zero, the upper eight bits of the counted value represent the number of rotations. However, when the most significant bit 15 of the rotation angle signal is zero and the least significant bit of the counted value is one, the number of rotations is obtained by adding one to the upper eight bits of the counted value.

Another embodiment is now explained with reference to FIG. 5. This second embodiment has the same signal detecting system as that of the first embodiment, shown in FIGS. 1-3, and processes the same signals as those of the first embodiment, shown in FIGS. 6-7. In the second embodiment, the upper eight bits of the rotation angle signal are calculated in a signal detecting system 102 in the same way as in the first embodiment as follows.

First, the timing signal and the gate-delayed timing signal are transmitted in an exclusive-OR gate (EX-OR) 150 to obtain timing pulses.

When the absolute signals A-H are fed into a D-flip-flop circuit 152 and the timing pulse is fed to a clock terminal CK in the flipflop circuit 152, the upper eight bits b8-b15 of the rotation angle signal are delivered from the flipflop circuit 152.

In the second embodiment, the number of rotation is calculated in the signal detecting system 102 in the same way as the first embodiment as follows.

The standard position signals ZA and ZB are detected by the magnetic detection elements 28A and 28B shown in FIG. 1, and are fed into an updown identification circuit 160. The updown identification circuit 160 determines whether the rotating disk 14 rotates forward or backward, and delivers an updown signal of zero when the rotating disk 14 rotates forward and an updown signal of one when the disk 14 rotates backward.

A pulse-waveform-shaping circuit 162 receives the standard position signals ZA and ZB and delivers a pulse signal. The updown signal is sent to the updown terminal D/$\overline{U}$ of a 9-bit updown counter 164. The pulse signal is sent to the clock terminal CK of the updown counter 164. Subsequently, the updown counter 164 delivers the upper eight bits of nine bits counted into an adder 166.

On the other hand, an AND gate 168 receives the least significant bit of the counted values, and the inverted signal of the most significant bit b15 of the rotation angle signal. The result from the AND gate 168 is sent to a terminal Co of the adder 166, where the result is added to the upper eight bits of the counted value to obtain an 8-bit rotation number r8–r1.

As shown in FIG. 7, when the most significant bit b15 of the rotation angle is one, the upper eight bits of the counted value represent the number of rotations. Also, when the most significant bit b15 of the rotation angle signal is zero and the least significant bit of the counted value is zero, the upper eight bits of the counted value represent the number of rotations. However, when the most significant bit 15 of the rotation angle signal is zero and least significant bit of the counted value is one, the number of rotations is obtained by adding one to the upper eight bits of the counted value.

As aforementioned, in the second embodiment, the upper eight bits of the rotation angle signal and the timing pulse are converted to 9-bit data in the same way as the first embodiment.

Figure 5:
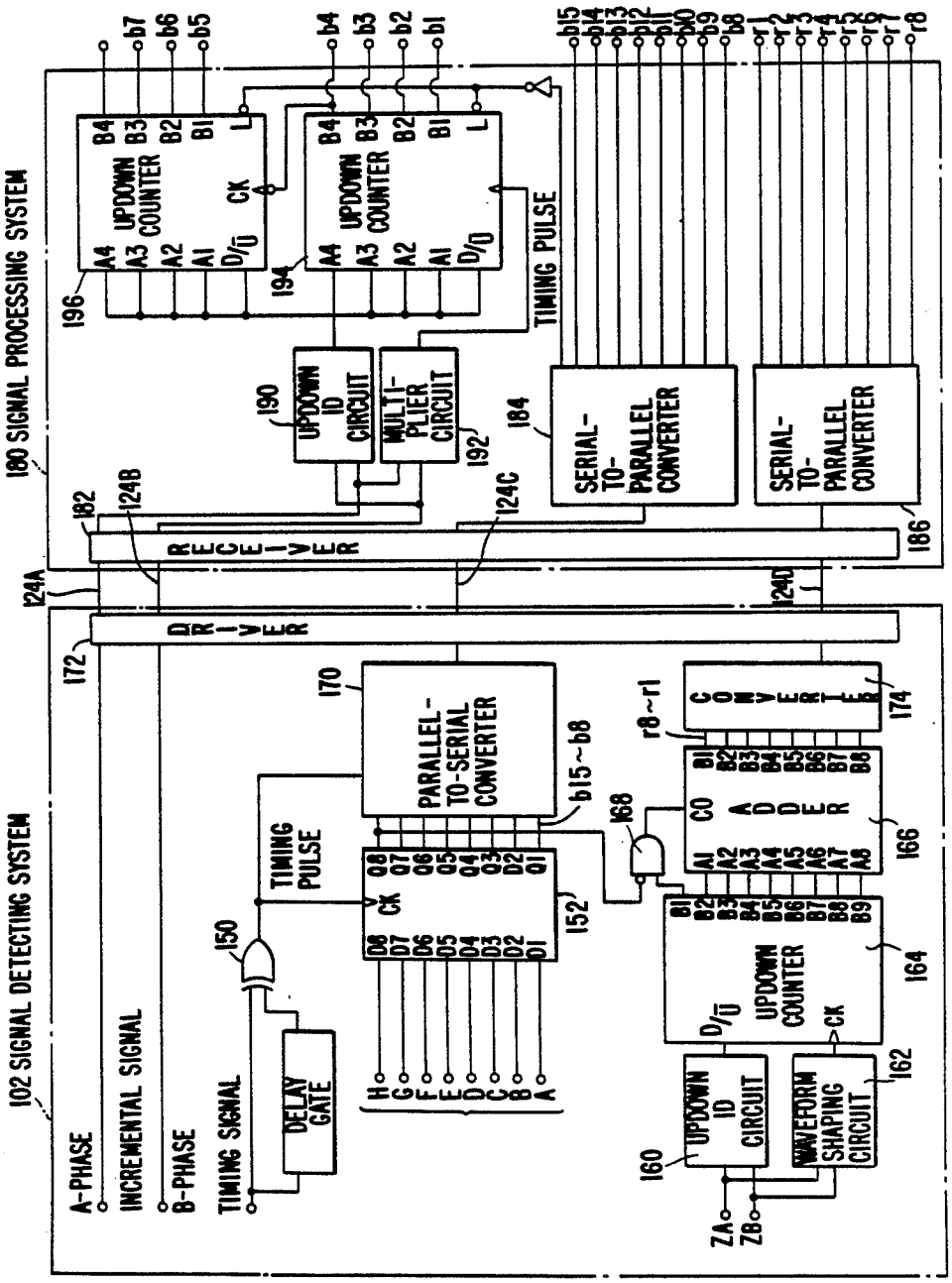
FIG. 5 is a block diagram showing circuits for the second embodiment.

However, unlike the first embodiment, in the second embodiment as shown in FIG. 5, the 9-bit data is converted to a serial signal by a parallel-to-serial converter 170. The serial signal is delivered through a driver 172 to a lead wire 124C. The number of rotations is converted to a serial signal by a parallel-to-serial converter 174. The serial signal is delivered through the driver 172 to a lead wire 124D.

The detected A-phase and B-phase incremental signals are delivered through the driver 172 to lead wires 124A and 124B, respectively, without being converted. A signal processing system 180 converts the serial signals to parallel signals and calculates the lower seven bits b7–b1 of the rotation angle signals.

First, signals are transmitted through the lead wires 124A–124D to a receiver 182. The serial-to-parallel converters 184 and 186 receive the serial signals from the lead wires 124C and 124D, convert the serial signals into the timing pulse, the upper eight bits b15–b8 of the rotation angle signal, and the eight bits r8–r1 of the number of rotations.

In the same way as the first embodiment, the A-phase and B-phase incremental signals are fed into an updown identification circuit 190. The circuit 190 determines whether the rotating disk 14 rotates forward or backward, and delivers an updown signal of zero when the disk 14 rotates forward and an updown signal of one when the disk 14 rotates backward. The A-phase and B-phase incremental signals are also fed to a frequency multiplier circuit 192. The frequency multiplier circuit 192 delivers the pulse signal multiplied by four.

Subsequently, the updown signal is transmitted into the updown terminal D/$\overline{U}$ and the preset terminals A1–A4 of two 4-bit updown counters 194 and 196. The pulse signal is fed to the clock terminal CK in the first updown counter 194.

When the timing pulse is fed to the load terminals L of the updown counters 194 and 196, each bit is set to zero when the rotating disk 14 rotates forward, and each bit is set to one when the disk 14 rotates backward. Each time one pulse signal is sent, each bit increases or decreases by one. As a result, the lower seven bits b1–b7 of the rotation angle signal are delivered from output terminals B1–B4 of the first counter 194 and output terminals B1–B3 of the second counter 196. In the second embodiment also, the output from the output terminal B4 of the second counter 196 is not used. Thus, the 15-bit digital signals b1–b15 is derived by obtaining bits b8–b15 from the absolute signal and bits b1–b7 from the incremental signal.

This signal processing system 180 delivers a 15-bit rotation angle signal and an 8-bit number-of-rotations signal. The delivered information is transmitted, for example, to a motor controller, and is used for control.

In the compound rotary encoder for the second embodiment, the signal detecting system 102 is connected with the signal processing system 180 by only four lead wires 124A–124D. However, this compound rotary encoder can detect the rotation angle and the number of rotations with high resolution and high precision.

In the second embodiment, when the timing pulse is generated, the absolute signal is read and the counted value of the incremental signal is initialized. The rotation angle information based on the absolute signal is thus synchronized with the number-of-rotations information based on the incremental signal.

The rotation angle information can be precisely detected from the incremental signals with high resolution. The lower seven bits of the rotation angle signal can be obtained from the incremental signals with high resolution without delay, because the bits are not converted in the serial-to-parallel converter.

In these embodiments, when the number of rotations is detected, the standard position signals ZA and ZB are first changed to 9-bit digital signals. Subsequently, the upper eight bits of the digital signal are compensated using the least significant bit of the 9-bit digital signal and the most significant bit of the rotation angle signal. Thus, the number of rotations is obtained.

Consequently, when the pulse is generated from the standard position signals ZA and ZB, and the most significant bit b15 of the rotation angle signal does not change, the correct number of rotations can be detected.

The magnetic detection elements 28A and 28B can be precisely mounted quickly and easily. Output values may fluctuate some. The encoder can be assembled and adjusted in short time. The reliability of the encoder is enhanced.

Since the prior-art absolute rotary encoder delivers the rotation angle signals as 15-bit digital signals, at least fifteen circular patterns are required. However, in these embodiments, by combining the absolute code pattern with the incremental code pattern, the rotation angle signal can generate the 15-bit digital signal with high precision using fewer circular patterns. Since the number of circular patterns is minimized, the rotary encoder for these embodiments can be compact. Moreover, fewer circular patterns permit a larger diametrical width for each circular pattern, and each signal can be precisely detected.

One rotary encoder can detect the rotation angle and the number of rotations at the same time; thus, the number of components in use can be decreased.

Furthermore, the rotation angle information is used for detecting the number of rotations. Consequently, the detected rotation angle information corresponds to the detected rotation number information.

In these embodiments, the rotation angle is optically detected, but it could also be detected magnetically. Alternatively, part of the code patterns could be optically detected, and remaining patterns could be magnetically detected. Conversely, the rotation number signal could be optically detected. The absolute code patterns for these embodiments are based on Gray code, but they could be based on any other code.

These are only two possible embodiments of the invention claimed below. These embodiments are only illustrations of the claims, and in no way restrict the scope of the claims.

What is claimed is:

1. A compound rotary encoder comprising:
   (a) a timing-signal detecting means including,
      (i) a timing code pattern on a rotating disk, and
      (ii) a timing-signal determining portion for reading the timing code pattern and detecting a timing signal;
   (b) an absolute-signal detecting means including,
      (i) an absolute code pattern on the rotating disk,
      (ii) an absolute-signal detecting portion on a fixed board for reading the absolute code pattern and detecting an absolute signal, and
      (iii) an absolute-signal determining portion for detecting upper m bits of n-bit rotation-angle signal of a rotor shaft from the absolute signal, m being larger than one and less than n, and m and n being integers;
   (c) an incremental-signal detecting means including,
      (i) an incremental code pattern on the rotating disk,
      (ii) an incremental-signal detecting portion on the fixed board for reading the incremental code pattern and detecting an incremental signal, and
      (iii) an incremental-signal determining portion for counting the incremental signal from the incremental-signal detecting portion, detecting a counted value of the incremental signal, and for delivering the lower l bits of the n-bit rotation-angle signal, l being n minus m; and
   (d) a timing control means for delivering the upper m bits of the n-bit rotation-angle signal and simultaneously initializing the counted value of the incremental-signal determining portion in synchrony with the timing signal.

2. A compound rotary encoder according to claim 1 in which the compound rotary encoder further comprises a standard position pattern on the rotating disk and a standard-signal detecting portion on the fixed board for reading the standard position pattern and detecting a standard position signal, the standard position signal being used for detecting a number-of-rotations signal of the rotor shaft.

3. A compound rotary encoder according to claim 2 in which the compound rotary encoder further comprises a rotation number calculating means for calculating the number-of-rotations signal based on the standard position signal.

4. A compound rotary encoder according to claim 3 in which the compound rotary encoder further comprises:
   a count signal detecting means for counting the standard position signal that generates once while the rotating disk rotates predetermined times and detecting k bits of the count signal, k being an integer larger than one;
   a comparison means for comparing the most significant bit of the n-bit rotation-angle signal with the least significant bit of the count signal; and
   an output means for delivering the number-of-rotations signal in response to the comparison means, the output means comprising,
      (i) a first output means for delivering the upper $k-1$ bits of the count signal as the number-of-rotations signal, when the most significant bit of the n-bit rotation-angle signal is in a first binary state and the least significant bit of the count signal is in the first binary state, or when the most significant bit of n-bit rotation-angle signal is in a second binary state and the least significant bit of the count signal is in the first binary state, and
      (ii) a second output means for adding the first binary state to the upper $k-1$ bits of the count signal and delivering the number-of-rotations signal, when the most significant bit of the n-bit rotation-angle signal is in the second binary state and the least significant bit of the count signal is in the second binary state.

5. A compound rotary encoder according to claim 3 in which the compound rotary encoder further comprises:
   a signal output means for delivering the upper m-bit absolute signal and the number-of-rotations signal as serial signals, and for delivering the incremental signal detected by the incremental signal detecting means;
   a signal input means for receiving the serial signal comprising the absolute signal, the number-of-rotations signal, and the incremental signal from the signal output means; and
   a converting means for converting the serial absolute signal into an m-bit parallel signal, and for converting the number-of-rotations signal into a parallel signal.

* * * * *